United States Patent
Truckenbrodt et al.

(10) Patent No.: US 8,616,633 B2
(45) Date of Patent: Dec. 31, 2013

(54) HEADREST FOR A VEHICLE

(75) Inventors: Gerd Truckenbrodt, Weiden (DE); Udo Beil, Wendelstein (DE); Gerhard Muenster, Vilseck (DE)

(73) Assignee: Grammer AG, Amberg (DE)

(*) Notice: Subject to any disclaimer, the term of this patent is extended or adjusted under 35 U.S.C. 154(b) by 850 days.

(21) Appl. No.: 12/613,801

(22) Filed: Nov. 6, 2009

(65) Prior Publication Data

US 2010/0127548 A1    May 27, 2010

(30) Foreign Application Priority Data

Nov. 10, 2008  (DE) .......................... 10 2008 056 540
Apr. 29, 2009  (DE) .......................... 10 2009 019 439

(51) Int. Cl.
  *B60N 2/42*  (2006.01)
  *B60N 2/48*  (2006.01)
(52) U.S. Cl.
  USPC ...................... 297/216.12; 297/391; 297/404
(58) Field of Classification Search
  USPC .................... 297/391, 404, 216.12
  See application file for complete search history.

(56) References Cited

U.S. PATENT DOCUMENTS

| | | | |
|---|---|---|---|
| 4,640,549 A * | 2/1987 | Yokota | 297/410 |
| 4,733,913 A * | 3/1988 | Tateyama | 297/409 |
| 4,762,367 A * | 8/1988 | Denton | 297/409 |
| 5,020,855 A * | 6/1991 | Lindberg et al. | 297/391 |
| 6,082,817 A * | 7/2000 | Muller | 297/216.12 |
| 6,550,856 B1 * | 4/2003 | Ganser et al. | 297/61 |
| 6,688,697 B2 * | 2/2004 | Baumann et al. | 297/391 |
| 6,715,829 B2 * | 4/2004 | Svantesson et al. | 297/216.12 |
| 7,073,856 B2 * | 7/2006 | Akaike et al. | 297/216.12 |
| 7,073,863 B1 * | 7/2006 | Low et al. | 297/404 |
| 7,284,793 B2 * | 10/2007 | Kluhspies et al. | 297/216.12 |
| 7,350,859 B2 * | 4/2008 | Klukowski | 297/216.12 |
| RE40,527 E * | 10/2008 | Veine et al. | 297/391 |
| 7,455,363 B2 * | 11/2008 | Chung | 297/407 |
| 8,038,219 B2 * | 10/2011 | Boes et al. | 297/410 |

FOREIGN PATENT DOCUMENTS

EP    0974484    1/2000

* cited by examiner

*Primary Examiner* — David Dunn
*Assistant Examiner* — Tania Abraham
(74) *Attorney, Agent, or Firm* — Andrew Wilford

(57) ABSTRACT

A headrest (10) for a vehicle seat has at least one base (11), such as a support rod or the like. A main body (12) is held on the base (11). A support part (13) having a head support surface (44) can move relative to the main body (12) forward in the forward direction (x) toward the back of the head of the vehicle occupant and back in the rearward direction (z).

The main body (12) is movable on the base (11) and can be shifted by at least one rotatable transmission element (K1; 28, 30) in the forward direction (x) and in the rearward direction (z). At the same time, the support part, which moveable in the same direction with the main body (12) in the forward direction (x) and the rearward direction (z), is pivoted on the same rotatable transmission element (K1; 28, 30).

9 Claims, 4 Drawing Sheets

HEADREST FOR A VEHICLE

FIELD OF THE INVENTION

The invention relates to a headrest for a vehicle seat, such as is known from EP 0,974,484 having a main body held on at least one base, such as a support rod or the like, and a support part having a head support surface, guided so as to be movable relative to the main body, and movable forward in a forward direction toward the back of the head of a vehicle occupant and back in a rearward direction.

BACKGROUND OF THE INVENTION

The known headrest of EP 0,974,484 is a crash-active headrest wherein, when a crash signal is generated, the support part that has a head support surface and that is supported on a rear main body is shifted forward in a forward or X direction is toward the back of the head of the vehicle occupant. Since in an accident the travel time is relatively short and hence the horizontal forward travel has to be effected relatively quickly, the horizontal travel is often relatively short in the case of crash-active headrests of this type for physiological reasons.

However, in actual use as shown by way of example in EP 730,993 (see [0024] here], it is necessary to have greater horizontal travel.

Headrests with longer horizontal travel are known, for example, from DE 31 09 592. In the case of this known headrest (see DE 31 09 592, FIG. 2), the entire head including its padding is shifted horizontally forward by a rack-and-pinion linkage relative to a support formed by two support rods. Since the rack must fit with its entire horizontal length in the casing of the headrest, the known headrest of DE 31 09 592 must be very deep, i.e. have a relatively voluminous design.

OBJECT OF THE INVENTION

Based on EP 0,974,484 mentioned above, the object of the invention is to further develop the known headrest such that, despite a relatively compact design, it permits relatively large adjustment paths horizontally.

SUMMARY OF THE INVENTION

This object is attained in that the main body is guided in a movable manner on the support and is movable by at least one rotatable transmission element in the forward and rearward directions and that the support part is pivoted in the forward and rearward direction on the same rotatable transmission element, moveable in the same direction as the main body.

In contrast to the known headrest of EP 0,974,484, in which the main body is arranged fixedly on the support with respect to the horizontal direction, with the known one, on a support tube stirrup, the invention has a main body movable relative to the base. Due to the fact that the headrest according to the invention furthermore has a support part having a head support surface and is moveable relative to the main body, a superimposition or addition of the two horizontal travels results, namely of the travel of the main body and of the travel of the support part.

Due to the fact that, according to the invention, the main body is horizontally moveable in the forward and rearward direction by at least one rotatable transmission element relative to the support, and in that the support part as well as the main body are both pivoted on the same rotatable transmission element to move in the same direction on rotation, in addition, the desire for a compact design is supported by reducing the number of parts with the headrest according to the invention.

Thus the invention has two different embodiments.

Accordingly, according to the first embodiment the one or more rotatable transmission elements are each a lever, and each rotatable transmission element is part of a coupling mechanism.

That coupling mechanism has at least four parts and thereby forms a parallelogrammatic linkage with two levers and two coupling links. A basic embodiment of a parallelogrammatic linkage of this type is shown, for example, in the textbook by Werner Krause, *Konstruktionselemente der Feinmechanik* (1993; Carl Hanser Verlag, Munich Vienna) page 724, table 13.11.1 (parallelogrammatic linkage).

In a further embodiment of the invention, the base, which can be, for example, two support rods or two support tubes optionally combined with a crosspiece, has an extension extending parallel to the rearward and forward direction and forming pivots for ends of the respective lever and horizontally or approximately horizontally spaced from one another.

In detail, according to a particular embodiment of the invention, a parallelogrammatic linkage is formed with parts of the headrest such that the main body has a first extension projecting in the forward direction and forming a first coupling link is supported in the center part of a lever by a respective pivot, while the support part has a second extension projecting rearward, forming a second coupling link, and supported by a pivot each on an end of a respective lever extending away from the extension of the base.

The above referenced embodiment according to the invention can be such that the two levers are generally vertical and pivoted on the extension of the base.

On the other hand, according to a preferred embodiment the invention alternatively provides that the two levers extend downward from and are pivotally hung from the extension of the base.

Although it is basically possible with the invention to arrange all of the geometric pivot joint axes of the pivots vertically and parallel, according to a preferred embodiment according to the invention the pivot axes of the pivots of the one or more rotatable transmission elements, the levers and the coupling links extend horizontally and parallel to one another.

The second embodiment according to the invention has two rotatable transmission elements that are supported on the base with parallel axes by two pivots spaced from one another.

A special feature of the second embodiment according to the invention lies in that each rotatable transmission element is a gear with an arm projecting radially from the gear axis and having an arm pivot on which a rear end of a control link is supported by a rear pivot, the front end of which control link is supported on the support part by a front pivot and extends toward the rear from the latter, while a gear rack extension projecting from the main body in the forward direction forms a rack-and-pinion linkage jointly with the gear.

A further development according to the invention in which a canted position of the front support part is automatically excluded, lies in that each control link is a double-arm lever connected in a movable manner to a synchronizing mechanism by a rear additional pivot spaced from the respective arm pivot.

In detail, in this further embodiment of the invention the synchronizing mechanism has two linking gears pivoted on the rear side of the support part with parallel axes, in engagement with one another, having the same dimensions, and symmetrical to one another, which linking gears each form an eccentric pivot bearing point for a one front end of a respective coupling link extending toward the support part and having a rear end remote from the support part and pivoted on and additional pivot of the respective control link.

In the context described above, in additional a space-saving construction is achieved in that the two coupling links cross each other Furthermore, to reduce the number of parts through the special functional incorporation of the base, the invention is provides that the base has two support rods or tubes extending parallel to one another and that the support rods or tubes form bearings for the gears of the rack-and-pinion linkage.

It is basically possible for the axes of all of the pivots to extend horizontally and parallel to one another. However, the preferred second embodiment according to the invention is characterized in that the axes of all of the pivots and the gear bearings extend vertically and parallel to one another.

BRIEF DESCRIPTION OF THE DRAWING

Preferred illustrated embodiments according to the invention are shown in the drawings, therein.

DETAILED DESCRIPTION OF THE INVENTION

In the following description of the drawings, the same reference numbers are used for the same parts or for parts operating in an analogous manner in a different embodiment.

Figure 1:
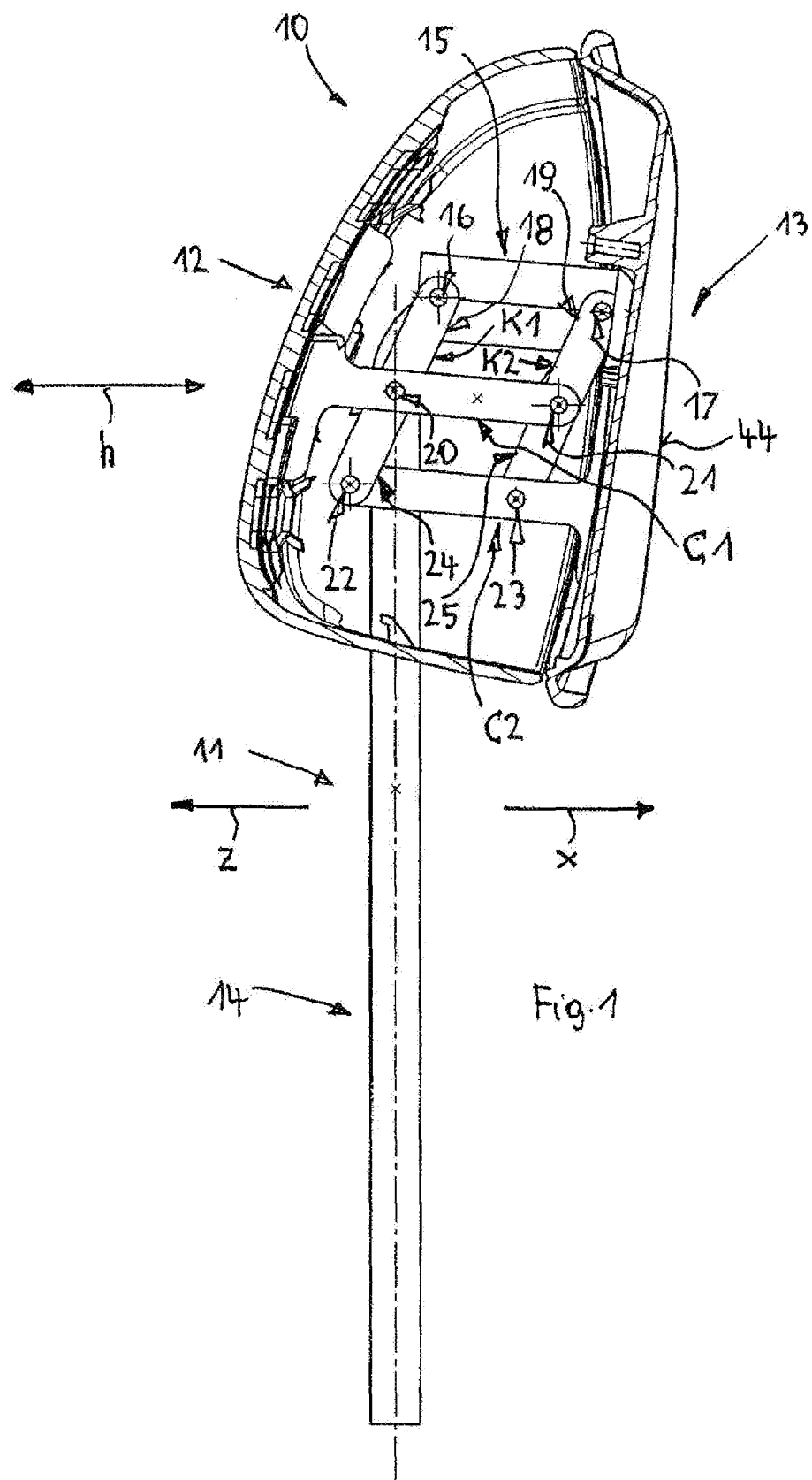
FIG. 1 is a vertical section through a first embodiment of a headrest in a rest position thereof.
Figure 2:
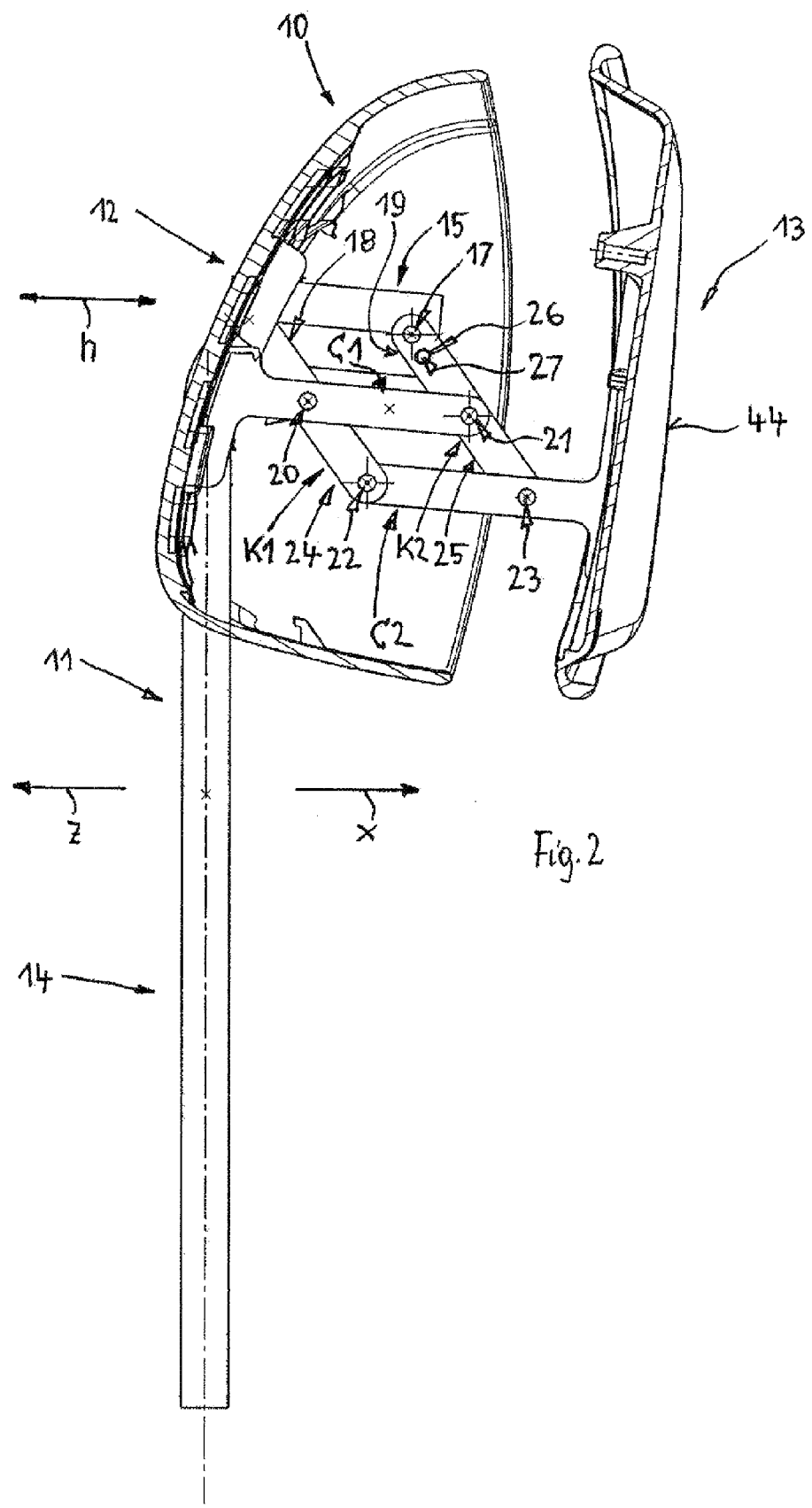
FIG. 2 shows the headrest of FIG. 1 in an operating position extended horizontally.

The headrest 10 of the first embodiment shown in FIGS. 1 and 2 has a U-shaped base 11, a main body 12, and a support part 13. The base 11 has two support rods 14 of which only one is visible in FIGS. 1 and 2. The lower ends of the support rods 14 are fitted in a manner not shown in mounting sleeves on the seat-back so as to be if necessary vertically adjustable.

At its upper end, the base 11 is provided with an extension 15. The extension 15 extends parallel or at least essentially parallel forward in a direction x and back in a rearward direction z.

The extension 15 has two pivots 16 and 17 spaced from each other by a spacing in a horizontal direction h for upper ends 18 and 19 of respective levers K1 and K2. The horizontal spacing h (see double arrow) is also in the forward and rearward directions x and z.

The main body 12 has a first extension C1 that projects forward in a forward direction x and that forms a first coupling link joined to centers of each lever K1 and K2 at respective pivots 20 and 21. The support part 13 itself has a second extension C2 that projects in the rearward direction z and that forms a second coupling link carrying pivots 22 and 23 on ends 24 and 25 of the levers K1 and K2 remote from the extension 15 of the base 11.

The two levers K1 and K2 extend downward from and are pivotally hung from the extension 15 of the base 11.

FIGS. 1 and 2 also show that the pivots 16, 17, 20, 21, 22 and 23 of the levers K1 and K2 and the axes of the coupling links C1 and C2 are marked with crosses and all extend horizontally and parallel to one another.

The structure shown by FIGS. 1 and 2 of the levers K1 and K2 and the coupling links C1 and C2 forms a parallelogrammatic linkage whose mode of operation is easily seen by a comparison of FIGS. 1 and 2.

In order to extend the support part 13 in the forward direction x from the rest position of FIG. 1 into the operating position of FIG. 2, the passenger grasps the support part 13 and pulls it forward in the direction x, for example, of FIG. 2 into the frontmost end position. Because of the linkage, the main body is also entrained by this action. Locking is advantageous in that horizontally advanced position. Locking means in this regard are shown diagrammatically in FIG. 2 by a hidden hole arrangement 26 and a hidden lock pin 27 that can be operated from outside the headrest 10.

FIGS. 1 and 2 also show that the headrest 10 can have two parallelogrammatic linkages K1, K2; C1, C2 next to each other.

As shown in FIGS. 1 and 2 it is also conceivable that, during movement from the rest position of FIG. 1 into the extended adjustment position of FIG. 2, the main body 12 and the support part 13 each move through a travel of magnitude 1, so that total travel in the direction x with the magnitude 2 results for the support part 13.

The second embodiment of the headrest has two rotatable transmission elements each formed by a gear 28 having a respective axis 29 from which a respective arm 30 extends radially. Each arm 30 has an arm pivot 31 on which a rear end 33 of a respective control link L is supported by a rear pivot 32. A front end 34 of each control link is supported on the support part 13 at a respective front pivot 35. The control link L extends rearward from the support part 13, and racks 36 projecting from the main body 12 in the forward direction x form together with the gears 28 respective rack-and-pinion assemblies.

Each control link L is a double-arm lever linked to a synchronizing mechanism shown generally at G at a rear additional pivot 37 spaced from the respective arm pivot 31.

The synchronizing mechanism G has two symmetrically oriented and meshing sector gears 38 rotatable on the rear of the support part 13 about parallel axes and of the same dimensions, these linking gears being supported by bearings 43 inside the support part 13. The gears 28 and 38 are advantageously formed as spur gears and straight-cut.

The linking gears 38 each form an eccentric pivot 39 for a front end 40 of a coupling link 41 extending toward the part 13 and having a rear end 46 remote from the support part 13 and each rotatable on a respective pivot 37 on a respective one of the control links L. The two coupling links 41 cross.

Otherwise, the base 11 has two support rods or tubes 14 extending parallel to one another, the support rods or tubes 14 each forming a bearing 42 for the respective gear 28 of the respective rack-and-pinion linkage 28, 36.

Figure 3:
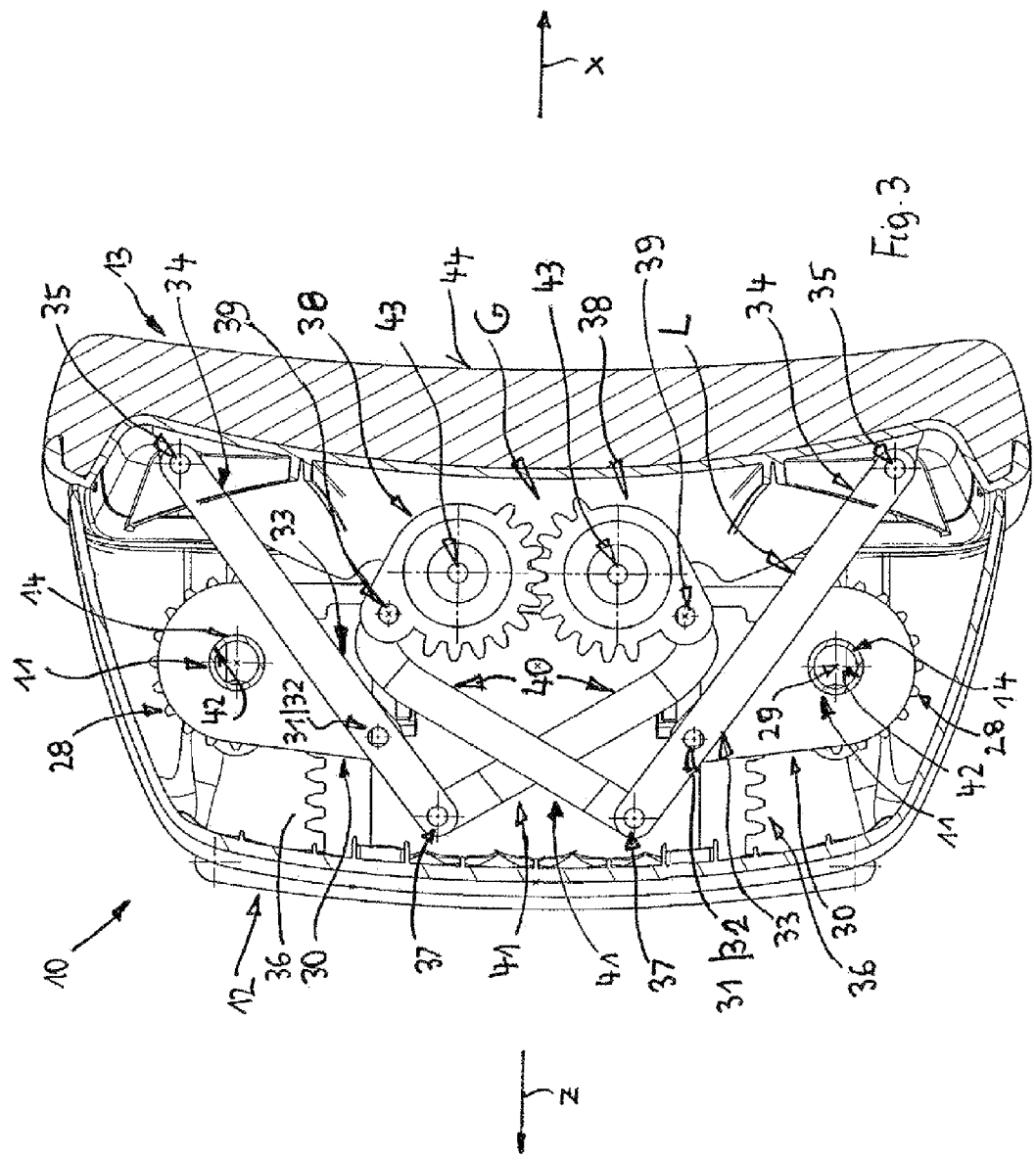
FIG. 3 is a horizontal section through a second embodiment of a headrest in the rest position thereof.
Figure 4:
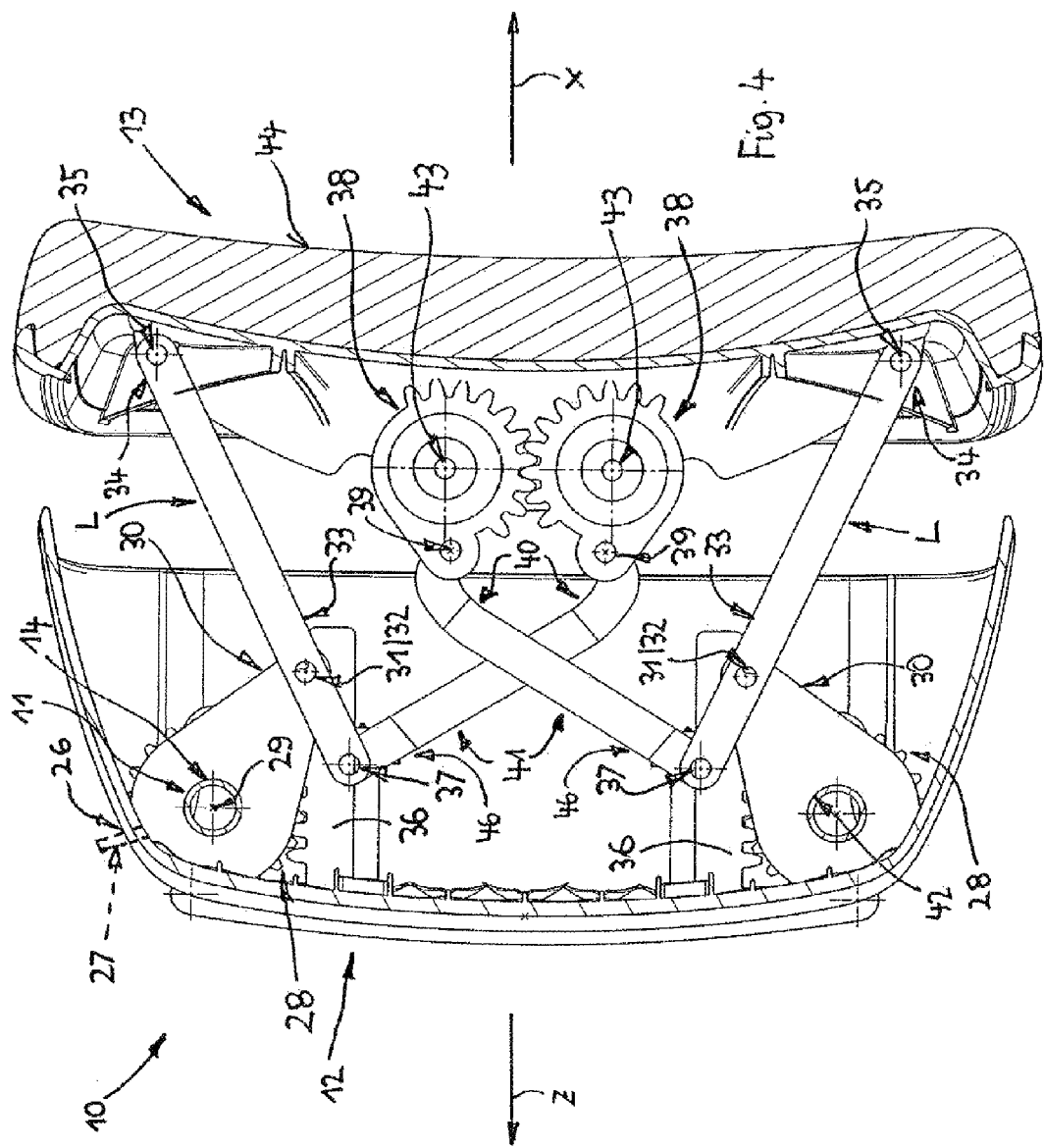
FIG. 4 shows the headrest of FIG. 3 in the extended operational position thereof.

Furthermore, FIGS. 3 and 4 show that the pivots 31, 32, 35, 37, and 39 and the bearing axes of the gears 28 and 38 extend vertically and parallel to one another.

The function of the second embodiment of the headrest 10 can be easily understood by a comparison of FIGS. 3 and 4. When a passenger grasps the front support part 13, pulling it in the forward direction x, —as with the headrest of FIGS. 1 and 2—the main body 12 as well as the support part 13 are pulled forward by the drive connection, the support part 13 entraining the main body 12.

At the same time, the synchronizing mechanism G ensures that the support part 13 with its head support surface 44 stays parallel to the main body 12 when moving horizontally. The horizontal travels are also additive with the headrest of FIGS. 3 and 4. When accordingly the main body 12 and the support part 13 cover a horizontal travel with the amount 1 from the rest position of FIG. 1 to the extended operating position of FIG. 2, a travel with the amount 2 results for the support part 13 as a whole.

Like the first embodiment (FIGS. 1 and 2), a hidden hole arrangement 26 with a hidden pin 27 (all indicated diagrammatically by broken lines) is also provided with the second embodiment (see FIG. 4). The hidden pin engages in the teeth of one of the gears 28 and in this manner blocks the headrest 10 in its extended operating position.

The invention claimed is:

1. A headrest for a vehicle seat, the headrest comprising:
   a base fixed to the seat;
   a main body shiftable horizontally forward and rearward relative to the base;
   a support part shiftable horizontally forward and rearward relative to the base and to the main body and engageable with a back of a head of an occupant of the seat;
   a pair of levers having first ends pivoted on the base at horizontally spaced parallel axes and second ends spaced from the first ends;
   pivots between the main body and locations on the levers between the respective first and second ends coupling the main body to the base for horizontally forward and rearward shifting the main body relative to the base on rotation of the levers on the base in forward and rearward directions; and
   respective pivots between the second ends and the support part coupling the support part to the main body for horizontally shifting the support part codirectionally with the main body on rotation of the levers on the base in the forward and rearward directions.

2. The headrest according to claim 1 wherein the pivots form a coupling mechanism having four parts.

3. The headrest according to claim 2 wherein the four-part coupling mechanism is a parallelogrammatic linkage with two levers and two coupling links.

4. The headrest defined in claim 1 wherein the base has a horizontal extension on which the first ends are pivoted, the support part has a horizontal extension on which the second ends are pivoted, and the main body has a horizontal extension vertically between the extensions of the base and support part and on which the locations of the levers are pivoted.

5. A headrest for a vehicle seat, the headrest comprising:
   a base;
   a main body having a first extension projecting in a forward direction toward the back of a head of a vehicle occupant and forming a first coupling link;
   levers supporting the main body on the base for movement in the forward direction and back in an opposite rearward direction and centrally pivoted on the extension; and
   a support part having a head support surface, pivoted on the levers so as to be movable in the same direction as the main body relative to the main body in the forward direction and in the rearward direction, and having a second extension protecting rearward and forming a second coupling link carrying pivots each on an end of a respective lever extending away from the extension of the base.

6. The headrest according to claim 5 wherein the two levers are generally vertical and are pivoted on the extension of the base.

7. The headrest according to claim 5 wherein the two levers extend downward from and are pivotally suspended on the extension of the base.

8. The headrest according to claim 7 wherein axes defined by the pivots of the levers and the coupling links extend horizontally and parallel to one another.

9. The headrest defined in claim 5, wherein the main body is generally forwardly cup-shaped and forms a cavity in a retracted position with the support part shifted in the rearward direction into engagement against the main body, the cavity in the retracted position containing the levers.

* * * * *